United States Patent [19]

Roberts, Jr.

[11] 3,903,342

[45] Sept. 2, 1975

[54] SOFT, ABSORBENT, UNITARY, LAMINATE-LIKE FIBROUS WEB WITH DELAMINATING STRENGTH AND METHOD FOR PRODUCING IT

[75] Inventor: Clifford J. Roberts, Jr., Turnersville, N.J.

[73] Assignee: Scott Paper Company, Philadelphia, Pa.

[22] Filed: Apr. 30, 1973

[21] Appl. No.: 356,051

[52] U.S. Cl. ............... 428/153; 156/183; 162/112; 428/152; 428/198; 428/361
[51] Int. Cl.² ..... B31F 1/12; B32B 3/28; B32B 7/14
[58] Field of Search ........... 161/156, 158, 148, 128, 161/129; 156/291, 290, 62.6, 183, 277; 162/112, 184, 231, 135, 111; 428/152, 153, 198, 361

[56] References Cited
UNITED STATES PATENTS

| | | | |
|---|---|---|---|
| 2,114,701 | 4/1938 | Charters | 162/112 |
| 3,047,444 | 7/1962 | Harwood | 156/291 X |
| 3,079,290 | 2/1963 | Marshall | 161/148 X |
| 3,138,514 | 6/1964 | Florio | 156/291 X |
| 3,203,823 | 8/1965 | Grimes | 156/291 X |
| 3,214,323 | 10/1965 | Russell et al. | 156/291 X |
| 3,630,800 | 12/1971 | Nash et al. | 156/291 X |
| 3,720,562 | 3/1973 | Drelick | 156/291 |

FOREIGN PATENTS OR APPLICATIONS

| | | |
|---|---|---|
| 1,294,794 | 11/1972 | United Kingdom |
| 1,311,619 | 3/1973 | United Kingdom |

*Primary Examiner*—Lorraine T. Kendell
*Attorney, Agent, or Firm*—R. Duke Vickrey; William J. Foley

[57] ABSTRACT

Disclosed is a unitary or single-ply, laminate-like fibrous web having first and second surface regions and a central core region which has less fiber concentration than the surface regions. Each surface region has a surface disposition of bonding material disposed only in that region to form a strong, abrasion-resistant surface. The central core region has a penetrating disposition of bonding material extending through that region in a fine, spaced-apart pattern occupying less area in the plane of the web than the surface bonding material in either surface region. The penetrating bonding material in the central core region penetrates entirely through that region and connects the first and second surface regions together. The area where the surface bonding material is disposed in at least one of the surface regions has been finely creped.

The preferred method of the invention consists of (a) forming a web of substantially planar aligned fibers, (b) applying a surface disposition of bonding material to one side of the web to penetrate only part way though the web in order to form a first surface region having a surface bonding material and a central core region free from the surface bonding material, (c) applying a surface disposition of bonding material to the second surface region to penetrate only through that surface region, (d) applying a penetrating disposition of bonding material to one side of the web in a fine, spaced-apart pattern which occupies less area in the plane of the web than either of the surface bonding materials and penetrates through the central core region to connect the first and second surface regions together, and (e) adhering the bonded portions of one surface region of the web to a creping surface in order to finely crepe those portions of the web upon creping of the web from the surface region.

14 Claims, 6 Drawing Figures

SOFT, ABSORBENT, UNITARY, LAMINATE-LIKE FIBROUS WEB WITH DELAMINATING STRENGTH AND METHOD FOR PRODUCING IT

BACKGROUND OF THE INVENTION

1. Field of the Invention

This invention relates to a unitary or single ply, laminate-like fibrous sheet material made preferably from predominately papermaking fibers and especially desirable for use as soft, absorbent, sanitary disposable towels and wipers, and to a method for making it.

2. Description of the Prior Art

A strong trend exists in the paper industry to develop disposable products from papermaking fibers and other fibers to serve as substitutes for conventional cloth products which are used as wipers and towels in both the home and industrial shops. To successfully gain consumer acceptance of these paper products, they must closely simulate cloth in both consumer perception and in performance. Thus, certain physical properties must be present in a successful product. These properties generally include softness, strength, stretchability, absorbency, ability to wipe dry, bulk and abrasion resistance. Depending upon the particular intended use of the product, some properties are more desirable than others.

Softness is one property which is highly desirable for almost all of the paper products regardless of their intended use. This is true not only because consumers find it more pleasant to handle soft feeling products, but also because softness enables the shape of the product to be readily conformable to the shape dictated by job requirements. Strength and the ability to stretch are two other properties which are desirable, particularly in those products which are to be used for heavy work duty. Also, it is desirable for the products to have good abrasion resistance if they are to be used for cleaning or scouring. If the primary function of the particular product is to wipe up spilled liquids, absorbency and the ability to wipe dry are two other properties which are highly desirable. Bulk is important not only because it enables the paper product to feel like cloth, but also because it is favorably interrelated to other desirable properties, such as softness and absorbency.

Some of these properties are somewhat adversely interrelated to each other. That is to say, an increase in one property is usually accompanied by a decrease in another property. For example, an increase in web density or fiber concentration (the closeness of the fibers to each other) increases the ability of the web to wipe dry or pick up moisture, due to the greater capillary action of the small spaces between the fibers. However, an increase in closeness of the fibers decreases the spaces between the fibers available for holding the moisture, and thus reduces the absorbency, in terms of quantity, of the web.

Perhaps an even more demonstrative example of the adverse interrelation between properties is represented by the relationship between strength and softness. It has generally been believed that conventional methods employed to produce soft paper necessarily result in strength reduction. This is because conventional paper products are formed from aqueous slurries, wherein the principle source of strength comes from interfiber bonds formed by the hydrate bonding process associated with papermaking. Paper which has a heavy concentration of these papermaking bonds is usually stiff. To soften the paper, it is necessary to reduce these stiff bonds, an action which also results in a loss of strength.

The method most commonly employed to reduce the stiff papermaking bonds is to crepe the paper from a drying surface with a doctor blade, disrupting and breaking many of the interfiber bonds in the paper web. Other methods which have been used to reduce these bonds contrast with creping by preventing formation of the bonds, rather than breaking them after they are formed. Examples of these other methods are chemical treatment of the papermaking fibers to reduce their interfiber bonding capacity before they are deposited on the web-forming surface, use of unrefined fibers in the slurry, inclusion into the slurry of synthetic fibers not exhibiting the ability to form papermaking bonds, and use of little or no pressing of the web to remove the water from the paper web after it is deposited on the web forming surface. This latter method reduces formation of bonds by reducing close contact of the fibers with each other during the forming process. All of these methods can be employed successfully to increase the softness of paper webs, but only with an accompanying loss of strength in the web.

Attempts to restore the strength lost by reducing the papermaking bonds have included the addition to the web of bonding materials which are capable of adding strength to a greater degree than adding stiffness to the web. One method which has been used to apply bonding materials to the web is to add the bonding material to the aqueous slurry of fibers and deposit it on the web-forming surface along with the fibers. With this method, the bonding material can be distributed evenly throughout the web, avoiding the harshness which would accompany concentrations of bonding material. However, this method has the disadvantage of reducing the absorbency of the web by filling the pores between the fibers with bonding material. It also bonds the web uniformly throughout, the disadvantage of which will be explained subsequently.

Another method which has been used to apply bonding material to the web is to apply the bonding material in a spaced-apart pattern to the web. By this method, the majority of the web surface does not contain absorbency-reducing bonding material. This method is commonly employed in the field of nonwovens where little or no strength is imparted to the web by papermaking bonds, and almost all of the strength is obtained from the bonding materials. (Some of the strength may be obtained from intertwining of fibers, where the fibers are long enough to do so.) However, the fibers in such nonwoven webs are sufficiently long to enable small amounts of bonding material to impart substantial strength to the web, because adjacent areas of the bonding material in the spaced apart pattern can be quite far apart and yet be able to bond each fiber into the network.

In contrast to nonwoven webs, webs made entirely or principally from papermaking fibers require bonding areas to be quite close together because papermaking fibers are very short, generally less than one-quarter of an inch long. Thus, it has been thought that to apply sufficient bonding material in a pattern to a paper web to the degree necessary to bond each fiber into the network would result in a harsh sheet, having poor softness characteristics, particularly in the areas where the bonding material is located.

A method has been discovered which reduces the harshness in the web area where the bonding material is concentrated. That method is disclosed in U.S. patent application Ser. No. 156,327 and, in its preferred form, consists of first forming a fibrous web under conditions which result in very low interfiber bonding strength by one of the previously described methods. Strength is then imparted to the web by applying bonding material to one surface of the web in a fine spaced-apart pattern. The harshness in the bonded areas is reduced by tightly adhering bonded portions of the web to a creping surface and removing with a doctor blade, thus finely creping the bonded portions to soften them. This form of controlled creping also results in a number of other property improvements. For example, selective creping of the bonded areas in the surface of the web creates contraction of the surface of the web in all directions, resulting in an increase in stretch in both the machine direction and the cross-machine direction of the web. Also, the portions of the web where the bonding material is not located are generally disrupted by the creping action, resulting in an increase in bulk of the web, an increase in the softness of the web, and an increase in absorbency. At certain locations within the web, close to the bonding material, the web develops internal split portions which further enhance the absorbency, softness, and bulk of the web. It is this effect on the portions where the bonding material is not located which does not exist, at least to the same extent, in the web formed by addition of bonding material to the aqueous slurry of fibers.

This method produces a paper web with outstanding softness and strength, two properties which were previously believed to be almost mutually exclusive. It also produces a web with excellent absorbency properties due to the bonding material being confined to only a minor portion of the web surface. Furthermore, the compaction of the surface fibers due to the shrinkage of the bonded portions on the web creates one surface of the web which has improved wipe-dry characteristics. It is also believed that pressing the web to a creping surface while the web has moist portions in the surface region due to the uncured or undried bonding material causes the fibers in those moist areas to compact.

This method is particularly useful in production of webs in a lower basis weight range for such use as bathroom tissues. However, it has shortcomings in making webs for heavier duty use such as for towels where greater strength, bulk and absorbency is desired. Examples of such shortcomings are poor abrasion resistance and inability to hold to the web the fibers on the nonbonded side of the web, as well as less strength in the overall web than may be desired. These properties could be improved by causing the bonding material to penetrate completely through the web to create a network of bonding material which passes entirely through the web, but the web would be subjected to a lesser extent to the improvements in the properties afforded by practice of the Ser. No. 156,327 invention. For example, bonding the web with the bonding material extending completely through the web would greatly reduce the disruption of the fibers within the web upon creping, and therefore, result in a reduction of bulk, softness, and absorbency. Also, complete penetration of the bonding material through the web is difficult to accomplish on heavier basis weight webs and attempts to do so result in concentrations of excess bonding material at the web surface where much of it is ineffective for strengthening interfiber bonds. Furthermore, if complete penetration of the bonding material does result, the bonding material in the interior of the web will not be as efficiently used to increase abrasion resistance of the web as when it is placed only in the surface of the web. Placement of the bonding material in the interior of the web is not only an inefficient use of the expensive bonding material, but results in harsher feel to the web due to the inability of the creping action to soften the bonded portions as effectively.

Also, one desirable feature of the Ser. No. 156,327 invention which would be reduced by bonding completely through the web is the ability to create a web surface of compacted fibers having good wipe-dry characteristics while at the same time creating a bulky web capable of absorbing a large amount of moisture. These properties are only of minor importance when producing a product for such uses as bathroom tissues, but where the product is to be used for wipers or towels, it is very important. In reference to this point, it should be noted that the product of the Ser. No. 156,327 invention has an additional shortcoming in regard to use as wipers or towels in that it exhibits good abrasion-resistance only on one side of the sheet, the side on which the bonding material is applied. This shortcoming detracts from the Ser. No. 156,327 invention as a method of producing a wiper or towel product, especially one which requires considerable work abuse.

Probably the most commonly employed method to produce a wiper-like paper product having the desirable bulk, absorbency, and abrasion-resistance, is to laminate two or more embossed conventional paper webs together with an adhesive. One advantage of this method is that the tightly compacted fibers of the conventional paper webs offer good wipe-dry properties on both sides of the sheet while at the same time, the void spaces between the webs created by the embossments spacing the webs from each other increase the ability of the web to hold moisture. Examples of this method are disclosed in U.S. Pat. Nos. 3,414,459 and 3,556,907. The disadvantages of this method are apparent when considering the complex process involved in separately embossing two or more webs and then bringing them together with synchronism to prevent nesting of the embossed protuberances of one web into the embossed protuberances of the other web. Also, any given length of the multi-ply product requires initial production on a papermaking machine of a web two or more times as long. Furthermore, prior art multi-ply paper products have generally been made from conventional paper webs which depend almost entirely upon stiff papermaking bonds for their strength.

Notwithstanding these shortcomings, multi-ply paper products are quite desirable in that they can be made very bulky compared to their weight, due to the void spaces between the plies created by the embossed protuberances holding the plies apart from each other. Because of this construction, multi-ply products are easily compressed between the fingers of the consumer, thereby aiding in giving some feeling of softness.

A consideration of the advantages of multi-ply products and the disadvantageous harshness of prior art multi-ply products would suggest making a multi-ply product by laminating two or more webs produced by the method disclosed in U.S. pat. application Ser. No. 156,327. However, the prior art methods of laminating multiple plies of webs together involve the undesirable requirements of a complex laminating process and the necessity of producing a greater length of initial web for laminating, both reducing the advantage of such a suggested product.

From the foregoing discussion, it can be seen that it would be very desirable and is, therefore, an object of the invention to produce a paper product which has the bulk, absorbency, and compressability of a conventional multi-ply paper product, but without the usual accompanying lack of softness due to their extensive dependence upon papermaking bonds for strength. It would also be very desirable and is, therefore, an object of the invention to produce a paper product with the desirable properties of a multi-ply product without the disadvantages of the complex process necessarily employed in the prior art. These desirable features are provided in the product of the invention produced by the method of the invention.

SUMMARY OF THE INVENTION

The product of the invention is a unitary or single-ply, laminate-like sheet material of planar-aligned fibers, preferably having a basis weight from about 15 to about 100 pounds per ream of 2,880 square feet, and which has advantages of and similarities to multi-ply webs. The web of the invention has on one side a strong, abrasion-resistant, laminate-like surface region having relatively close fiber concentration, and on the other side a surface region which is abrasion-resistant and preferably is a strong, laminate-like region. Between the two surface regions is a soft, central core region having lesser fiber concentration than at least one of the surface regions, increasing the softness and absorbency of the product.

The laminate-like surface region, or regions, has surface bonding material disposed within it, preferably in a fine, spaced-apart pattern, to bond the fibers into a strong network within the surface region and to impart abrasion-resistance to that side of the web. Penetrating bonding material is disposed within the central core region in a fine, spaced-apart pattern which occupies less area in the plane of the web than the surface bonding material in the laminate-like surface region. The penetrating bonding material in the central core region extends entirely through the central core region and connects the two surface regions together. To interconnect the two surface regions, the penetrating bonding material extends through the central core region to within at least one fiber thickness of the surface bonding materials on both sides of the web, or where only one side of the web has a laminate-like surface region, to within at least one fiber thickness of the web surface opposite the laminate-like surface region where it not only interconnects the two surface regions, but also increases abrasion-resistance to the opposite surface.

While being extremely useful in interconnecting the two surface regions of the web, the penetrating bonding material in the central core region can cause many of the disadvantages described in the description of the prior art. For example, the bulking effect created by creping is lessened in those areas where bonding material penetrates through the central core region. Also, the areas of the web where the penetrating bonding material is disposed are harsher than the areas where it is not so disposed. For these reasons, the penetrating bonding material in the central core region preferably occupies a small area in the plane of the web, always less than that occupied by the surface bonding material in the laminate-like surface region. By limiting the area occupied by the penetrating bonding material to less than about 10% of the plane of the finished web, and by uniformly distributing the penetrating bonding material in the plane of the web, the disadvantages referred to above can be substantially eliminated while still providing a web having its surface regions satisfactorily held together to prevent delamination. It is particularly desirable to limit the area occupied by the bonding material in the central core region to between about 0.05% to about 2%. With this distribution, the central core region will have the great majority of its portion consisting of a low concentration of fibers, adding bulk and absorbency as well as softness and compressability to the web. In a preferred embodiment, the central core region of the web includes split portions and caverns disposed at spaced locations throughout, providing even greater bulk, softness and absorbency to the web.

The most preferred form of the web is one formed from short fibers having a predominate length less than one-fourth inch randomly oriented in the plane of the web and having very little interfiber bonding in those areas of the web not containing bonding material. In this type of web, practice of the invention produces a web product having both good delamination strength and excellent bulk, absorbency, and softness.

In the preferred form of the invention, both surface regions have surface bonding material disposed within them to form two strong, abrasion-resistant, laminate-like regions sandwiching the central core region between them. It is preferred that the surface bonding material in at least one of the surface regions be disposed in a fine, spaced-apart pattern which occupies between about 15% and about 60% of the surface area of that surface region and penetrates from about 10% to about 60% through the thickness of the finished web. Preferably, both surface regions in the web contain surface bonding material in this pattern. It is greatly preferred that the bonded regions in at least one surface region, and preferably both, be finely creped by employing the bonding material in that surface region as a creping adhesive. "Fine creping" as the term is used in the specification and claims, is the resulting creping effect which occurs to the portions of a web held tightly to a creping surface with adhesive. It may manifest itself in the adhesively adhered portions in greater foreshortening and/or greater number of creping wrinkles and/or greater degree of softening than would have been obtained by creping of the same portions of the web without the use of adhesive. Where the fine creping is confined to a pattern on the web, as it is in the preferred forms of the invention, it causes the creping effect on the entire web to be predominately concentrated in the areas of the web which are adhesively adhered to the creping surface, and thus, produces a patterned crepe.

The method of the invention consists of forming a web of substantially planar-aligned fibers, preferably having a basis weight of from about 12 to about 80 pounds per ream of 2880 square feet; applying a surface disposition of bonding material to one side of the web to penetrate only partway through the thickness of the web, which forms in the web a first surface region having the surface bonding material and a central core region which is free of the surface bonding material and is bonded on the side opposite the first surface region by a second surface region; applying a penetrating disposition of bonding material to one side of the web to penetrate through the central core region and interconnect the first and second surface regions together, the penetrating bonding material being applied in a fine, spaced-apart pattern which occupies less area in the plane of the web than the surface bonding material in the first surface region; creping the web to increase the bulk of the web and to decrease the fiber concentration in the central core region to a greater extent than in the first surface region.

In the preferred method of the invention, the surface bonding material is applied in a fine, spaced-apart pattern occupying between about 15% and 60% of the finished web surface area and penetrating from about 10% to about 60% through the thickness of the finished web, and the penetrating bonding material occupies less than about 10% of the area in the plane of the web. It is also preferred that the web be pattern controlled creped by adhering the portions of the web in the first surface region having bonding material to a creping surface with the bonding material and creping the web from the surface. In the most preferred embodiments, surface bonding materials are applied to both sides of the web in a fine, spaced-apart pattern and are sequentially employed to adhere each side of the web to a creping surface and the web is creped in this controlled pattern manner on each side. Other variations exist which will be described subsequently.

DESCRIPTION OF THE PREFERRED EMBODIMENTS

Figure 1:
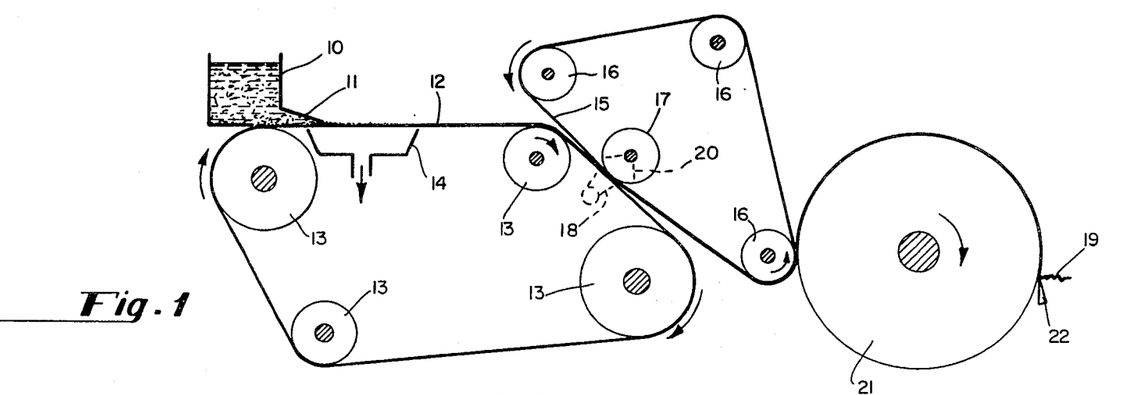
FIG. 1 is a schematic side elevation view of one form of apparatus for forming a fibrous web suitable for treatment by the method of the present invention to form the sheet material of the invention.

FIG. 1 schematically illustrates a papermaking machine which is capable of forming a web to which the method steps of the present invention are applied. A head box 10 is provided to hold a supply of fiber furnish, which generally comprises a dilute slurry of fibers in water. The head box 10 has slice lips 11 disposed over the moving surface of a condenser 12, which in this embodiment comprises a foraminous woven wire such a Fourdrinier wire. The fiber furnish in head box 10 issues from the slice lips 11 onto the surface of the wire 12. The wire 12 is carried through a continuous path by a plurality of guide rolls 13, at least one of which is driven by drive means (not shown). A vacuum box 14 is disposed beneath the wire 12 and is adapted to assist in removing water from the fiber furnish in order to form a web from the fibers. In addition, other water removal means such as hydrofoils, table rolls, and the like (not shown) may be employed beneath the upper flight of the wire 12 to assist in draining water from the fiber furnish. Upon nearing the end of the upper flight of the Fourdrinier wire 12, the web is transferred to a second carrying member 15, which may be either a wire or a felt. This second carrying member 15 is similarly supported for movement through a continuous path by a plurality of guide rolls 16.

The transfer of the web from wire 12 to member 15 is accomplished by lightly pressing the carrying member 15 into engagement with the web on the wire 12 by a pickup roll 17. The web transfer from wire 12 to member 15 may be accomplished or assisted by other means such as an air knife 18 directed against the surface of wire 12 opposite the web, or a vacuum box 20 within the pickup roll 17, or both, such means being well known to those skilled in papermaking techniques. At least one of the rolls 16 or 17 supporting the second carrying member 15 is driven by means (not shown) so that member 15 has a speed preferably equal to the speed of the wire 12 so as to continue the movement of the web.

The web is transferred from member 15 to the surface of a rotatable heated dryer drum 21 such as a Yankee dryer. The web is lightly pressed into engagement with the surface of the dryer drum 21 to which it adheres, due to its moisture content and its preference for the smoother of two surfaces. In some cases, it may be desirable to apply a creping adhesive, such as animal glue, uniformly over the web surface or drum surface. As the web is carried through a portion of the rotational path of the dryer surface, heat is imparted to the web, and generally most of the moisture therein is removed by evaporation. The web 19 is removed from the dryer surface in FIG. 1 by a creping blade 22, although it could be removed therefrom by peeling it off without creping, if this were desired.

Drying may be accomplished by drying means other than the drying drum 21. Thus, the dryer may take a substantially different form, such as that shown in U.S. Pat. No. 3,432,936. This type of dryer accomplishes the removal of moisture from the web by passing air through the web to evaporate the moisture without applying any mechanical pressure to the web. This latter feature is advantageousely used in connection with the present invention for a number of reasons set forth below. In addition, a web which is dried in this manner is not usually creped, and this may be a desirable feature in certain instances.

At this point, regardless of the particular apparatus or process utilized, a base web of planar-oriented fibers is formed which can be treated in accordance with the method of the present invention to form a sheet material of the present invention. (Planar-oriented is defined as having substantially all of the fibers oriented in the plane of the web.) The web preferably comprises principally lignocellulosic fibers like wood pulp or cotton linters used in papermaking, which are short fibers of less than one-fourth inch length. However, the web may be formed with a portion or all of the fibers being relatively longer fibers and still retain advantages of the present invention. Examples of such relatively longer fibers are cotton, wool, rayon, regenerated cellulose, cellulose ester fibers such as cellulose acetate fibers, polyamide fibers, acrylic fibers, polyester fibers, vinyl fibers, protein fibers, fluorocarbon fibers, dinitrile fibers, nitrile fibers, and others, natural or synthetic. The length of these other fibers may be up to about 2½ inches long, although shorter lengths are advantageous in forming the web on conventional papermaking equipment. Furthermore, because the primary purpose of the invention is to connect surface regions of a web together through a soft, weak central core region with bonding material occupying a minor portion of that core region, the invention is less necessary and not as advantageous where longer fibers are employed in the web. The invention offers particular economic advantage where substantially all of the fibers are short papermaking fibers. The invention also offers particular advantage where the base web is one having generally uniform fiber concentration through the thickness of the web, such as is formed by conventional papermaking techniques. Webs of this type are then processed by the steps of the invention to form laminate-like webs.

The web 19 preferably has a basis weight such that in the finished product the basis weight will be between about 15 and about 100 pounds, and more preferably between about 25 and about 60 pounds per 2880 square feet. This means that the web 19 upon being formed into a base web, should have a basis weight between about 12 and about 80 pounds, and more preferably between about 22 and about 45 pounds per 2880 square feet, in practicing the preferred forms of the invention. It is sheet products in this general range which benefit most from the method of the invention since they are largely used where the features of the invention are important. And it is in this range of basis weight where the process is most successful in imparting the desired properties to the invention.

In the preferred embodiments of the present invention, the web at this point, that is, just prior to being subjected to the process steps of the invention, preferably possesses certain physical characteristics so that when it is treated by subsequent steps of the method of the invention, it is transformed into a sheet material of superior properties. Broadly described, these characteristics possessed by the web to be treated are all evidenced by a reduced amount of interfiber bonding strength in the web. The effect of such reduced interfiber bonding strength is to substantially alter a number of characteristics of the web when subjected to the process of the invention, for example, the bulk and softness of the web as well as the overall strength of the web.

Thus, although any fibrous web of planar-aligned fibers may be advantageously treated by the method of the present invention to create a softer, stronger, and generally bulkier web, the preferred form of sheet material of the present invention is made by treating webs which initially are relatively soft, bulky and quite weak. All of these properties are generally possessed by a web which has a low, interfiber bonding strength and which is formed from randomly oriented short fibers, such as papermaking fibers. The method of the present invention then imparts an improved combination of softness, bulk, absorbency, and strength, both in the plane of the web and through its thickness, to such webs.

Webs formed by deposition of dry fibers upon a forming surface, such as by conventional air laying techniques, will be relatively weak and soft, particularly if the fibers are too short to intertwine among themselves. However, conventionally formed paper webs are generally stronger than desired for practicing the preferred form of the invention and should preferably have their interfiber bonding strength reduced. This reduced interfiber bonding strength can be achieved in several ways. Thus, in some instances, the web is creped, perhaps during its removal from the Yankee dryer 21 as shown in FIG. 1. Such a web is characterized by good softness and bulk characteristics due to the large number of interfiber bonds which are disrupted or broken during the creping operation. Such a web is also relatively weak and has good stretch characteristics, at least in the machine direction if conventionally creped, and perhaps in the cross-machine direction if creped successively in different directions, as is well known in the art.

In other instances, the fibers utilized to form the web 19 may be treated to reduce their debonding by such means as use of unrefined fibers or addition to the slurry of synthetic fibers which do not form papermaking bonds. Also, the fibers can be treated with a chemical debonder placed either in the fiber furnish, or prior to the addition of the fibers to the furnish, or even after formation of the web but prior to drying, such as when the web is carried on the wire 12. Such chemical debonders are commonly used to reduce the number of sites along the individual fibers which are susceptible to interfiber bonding of the type utilized in papermaking. Debonding agents which may be used for this purpose include the cationic debonding agents disclosed in U.S. Pat. No. 3,395,708, that is, substances within the class of long chain cationic surfactants, preferably with at least 12 carbon atoms and at least one alkyl chain, such as fatty dialkyl quaternary amine salts, mono fatty alkyl tertiary amine salts, primary amine salts, and unsaturated fatty alkyl amine salts; the cation-active tertiary amine oxides disclosed in U.S. Pat. No. 2,432,126; and the cation-active amino compounds disclosed in U.S. Pat. No. 2,432,127.

In combination with any of the methods described above, or alone, interfiber bonding strength is further reduced if the web is formed under conditions of reduced pressing while it is wet. Preferably, no mechanical pressing of the web is carried out. That is, the web is not subjected to significant compression between two elements or surfaces until it is substantially dried (preferably at least 80% dry). Thus, contrary to typical papermaking techniques, wherein a pick-up roll is used to press a felt into engagement with a web on a wire to transfer the web from the wire to the felt, this transfer may be accomplished by the use of air or vacuum or both. The alternative arrangement shown in phantom lines in FIG. 1 illustrates the manner in which this can be accomplished.

The use of any of these systems accomplishes web transfer without the application of pressure in any substantial amount to the web. Consistent with these systems, the web should not be pressed while wet into engagement with a surface of the Yankee dryer by means such as a pressure roll, a step commonly done on conventional papermaking machines, but rather drying should be accomplished through the use of air flowing over or through a web as by the transpiration drying process disclosed in U.S. Pat. No. 3,432,936. The fibers forming the web are therefore not pressed into intimate engagement with one another while the web is wet, and the number of contact points between fibers is reduced, resulting in a reduction of interfiber bonding strength. Such conditions of reduced pressing are preferably maintained until the web is substantially dried so that few interfiber bonds are formed.

Of course, the foregoing clearly indicates that a press section, such as is conventionally used to extract moisture from a freshly formed web prior to thermal drying, should not be employed when practicing the preferred method of the invention. Such a press section results in substantial compaction of the web, thereby increasing the number of interfiber bonds and the resulting interfiber bonding strength of the web when it is dried.

The best web softening results are obtained when the fibers in the web are treated with a chemical debonder, or when the web is formed under conditions of little or no pressing while it is wet, or when a combination of the above conditions is present, and then creping the web. This is believed to be due to the fact that creping has a very substantial bulking effect on webs which have very low interfiber bonding strength. Since bulk and softness are properties which the method of the present invention is utilized to obtain, it is desirable to optimize those properties in the web prior to treatment by the method of the present invention in order to enable them to be even further improved. But, regardless of the particular form of the web, treatment by the method of the present invention will enhance the bulk, softness and strength properties and impart substantial stretch to it in addition to improving other properties desirable in a wiper product.

Figure 2:
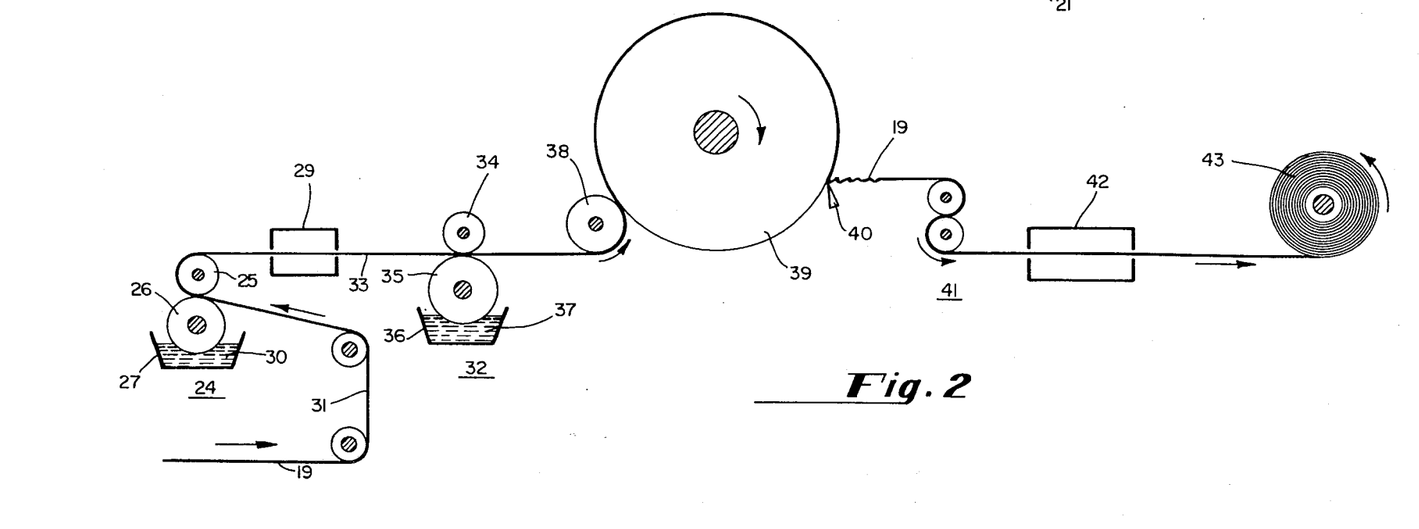
FIG. 2 is a schematic side elevation view of a portion of one form of apparatus for carrying out the method steps of the invention.
Figures 3, 4:
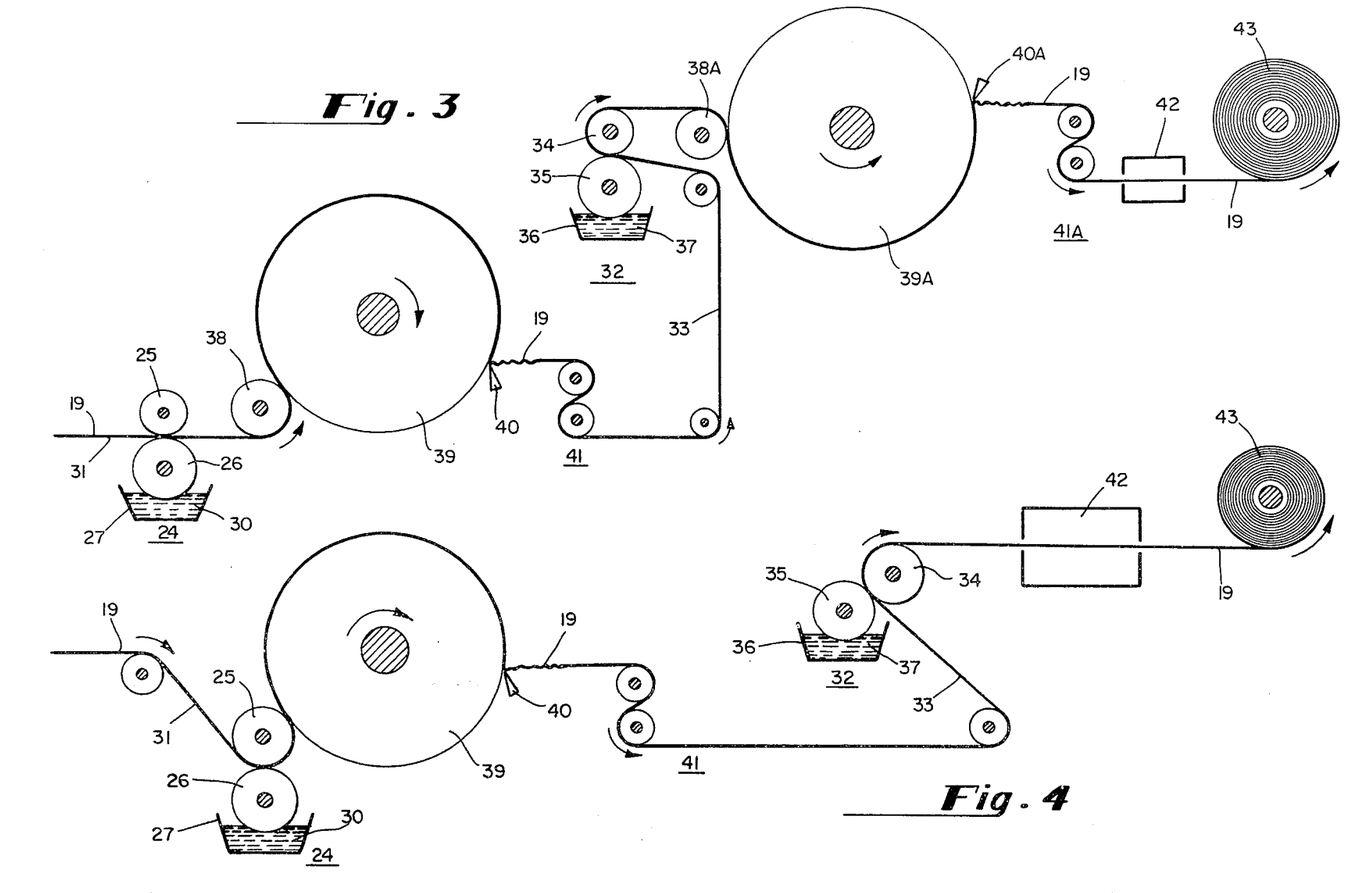
FIG. 3 is a schematic side elevation view of a portion of the preferred form of apparatus for carrying out the preferred method steps of the invention.
FIG. 4 is a schematic side elevation view of a portion of another form of apparatus for carrying out the method of the invention.

FIGS. 2, 3, and 4, illustrate three alternative forms of apparatus for carrying out preferred forms of the method of the present invention. Referring to FIG. 2, one form of apparatus for performing the method of the invention is illustrated. In this apparatus, the web 19 which may have been formed on the apparatus illustrated in FIG. 1, or by other means previously described, is passed through the first bonding-material application station 24. This station 24 includes a nip formed by a smooth rubber press roll 25 and a patterned metal rotogravure roll 26. The lower transverse portion of the rotogravure roll 26 is disposed in a pan 27 containing a first bonding material 30. The rotogravure roll 26 applies in its engraved pattern, bonding material 30 to the first surface 31 of the web 19 as the web 19 passes through the nip. Rotogravure roll 26 includes two engraved patterns. The first pattern applies a surface disposition of bonding material to generally bond one surface region of the web, but not to interconnect both surfaces of the web. The second pattern on rotogravure roll 26 applies a penetrating disposition of bonding material to penetrate through to the second surface of the web and interconnect the two surfaces together. To accomplish the different degrees of penetration of the bonding material from the two different patterns, the engraved depth of the gravure pattern for the second pattern is greater than that for the first pattern. Thus, a larger amount of bonding material is released from the second pattern and deeper penetration of the bonding material is accomplished. After application of the bonding material to the first surface 31 of web 19, the web 19 is preferably passed through a drying station 29 where the adhesive is dried or set sufficiently to prevent it from sticking to the press roll in the next bonding-material application station. The drying station 29 consists of any form of heating unit well known in the art, such as ovens energized by infrared heat, microwave energy, hot air, etc.

The web 19 then passes through a second bonding-material application station 32 where a surface disposition of bonding material is applied to the opposite side 33 of the web 19. The second bonding-material application station 32 is illustrated by smooth rubber press roll 34, rotogravure roll 35, and pan 36 containing a second bonding material 37. This bonding material is also applied to the web 19 in a pattern arrangement, although not necessarily the same pattern as that in which surface bonding material is applied to the first side 31. Even if the two patterns are the same, it is not necessary to register the two patterns to each other. Penetration of the bonding material at the second material application station 32 is controlled to extend only part way through the thickness of the web and to not generally interconnect with the bonding material in the first pattern.

The web 19 is then pressed into adhering contact with the creping drum surface 39 by the press roll 38, and the second bonding material 37 causes only those portions of the web 19 where it is disposed to adhere tightly to the creping surface 39. The web 19 is carried on the surface of the creping drum 39 for a distance and then removed therefrom by the action of a conventional creping doctor blade 40, which performs a creping operation on the bonded portions of the web 19. That is, it imparts a series of fine fold lines to the portions of the web 19 which adhere to the creping surface 39. At the same time, the creping action causes the unbonded or lightly bonded fibers in the web portion to puff up and spread apart, forming shaped web portions having excellent softness and bulk characteristics. The extent and form of this type of crepe is controlled primarily by the pattern in which the web is adhered to the creping drum 39 and to some extent by the pattern of the bonding material on the opposite side 31 (the side away from drum 27) of the web.

The creping surface 39 can be provided by any form of surface to which the bonding adhesive will tightly adhere to enable creping of the web 19 from the surface 39. Preferably, the creping surface 39 is heated to increase the adhesion of the web to the drum and to dry the web. An example of a suitable creping surface is a Yankee dryer.

The web 19, having been controlled pattern creped, is pulled from the creping doctor blade 40 through a pair of driven pull-rolls 41 which control the degree of crepe by the difference in their speeds and the speed of the creping surface. The web 19 is then optionally passed through curing or drying station 42 to cure or dry the bonding material on both sides and inside of the web 19, if further cure is required. The curing or drying station 42 may be of any form well known by those skilled in the art, such as those forms described for drying station 29. After passing through the curing or drying station 42, the web 19 is wound into a parent roll 43 by conventional winding means (not shown). It may then be transferred to another location to cut it into commercial size sheets for packaging.

FIG. 3 illustrates an apparatus for performing the preferred method of the invention. In this apparatus, the web 19, which may have been formed on the apparatus illustrated in FIG. 1, or by other means previously described, is passed through the first bonding-material application station 24, which may be of the same type illustrated in FIG. 2, and where bonding material 30 is applied to the first side 31 of the web 19 in a fine pattern corresponding to the pattern of the rotogravure roll 25. As was the case with FIG. 2, rotogravure roll 25 preferably includes both the first and second patterns. Also, as with FIG. 2, the penetration of the bonding material in the two patterns is controlled. Without drying or curing the bonding material, the web 19 is then pressed into adhering contact with creping drum surface 39 by the press roll 38. The bonding material 30 causes only those portions of the web 19 where it is disposed to adhere tightly to the creping surface 39.

The web 19 is carried on the surface of the creping drum 39 for a distance sufficient to heat the bonding material enough to tightly adhere the web 19 to the creping drum 39 and then is removed therefrom by the action of the creping doctor blade 40, performing a first controlled pattern crepe on the web 19.

The web 19, having been controlled pattern creped, is pulled from the creping doctor blade 40 through a pair of driven pullrolls 41 and then is advanced about turning rolls to a second bonding-material application station 32, illustrated by smooth rubber transfer roll 34, rotogravure roll 35 and pan 36 containing second bonding material 37. This bonding material is also applied to the web 19 in a pattern arrangement which creates a surface disposition of bonding material and which is not necessarily the same pattern as that of the first bonding material.

After applying the second bonding material to the web 19, the web 19 is pressed into contact with a second creping surface 39A by press roll 38A. The web 19 is carried on the surface of the second creping drum 39A for a distance and then removed therefrom by the action of a second creping doctor blade 40A, performing a second controlled pattern creping operation on the web 19.

The web 19 is then pulled from the creping doctor blade 40A with a second set of driven pull-rolls 41A and then may be optionally advanced through a curing or drying station 42 of the same type described for FIG. 2. The web 19 is then wound into a parent roll 43 in the same manner as described for FIG. 2.

FIG. 4 illustrates another apparatus for performing another alternative method of the invention. The apparatus illustrated in FIG. 4 is the same as the apparatus illustrated in FIG. 3 up through the second bonding-material application station 32, after which, in the FIG. 4 apparatus, the web 19, having bonding material disposed on both sides 31 and 33, is passed through the curing or drying station 42 without a second controlled pattern creping. The web 19 is then wound into parent roll 43, in the same manner as in FIGS. 2 and 3.

Referring to the three apparatus illustrated in FIGS. 2, 3, and 4, some variation is permissable in the bonding-material application stations. For example, one of the application stations could be arranged to print the bonding material directly on the creping drum just prior to placing the web 19 into contact with it. Also, the penetrating disposition of bonding material can be applied in the second bonding-material application station 32 rather than the first bonding-material application station 24. Or, it can be applied in a third bonding-material application station (not shown) separate from the first two. Also, the bonding-material application stations can be provided by means other than rotogravure rolls, such as flexigraphic means and spraying means, including the use of silk screening. Furthermore, only one bonding-material application station may be necessary when practicing the form of the invention in which a surface disposition of bonding material is applied to only one side of the web.

The patterns of surface bonding material applied to the web 19 on either side are preferably in a form of fine lines or fine, discrete areas which preferably leaves a substantial portion of the surface of the web 19 free from bonding material. The width of the lines can be varied, depending to some extent upon the length of the fibers in the web. An example of a satisfactory width for webs of short fibers is about 0.01 inches. Preferably, the pattern should be such that the surface bonding material occupies between about 15% and about 60% of the total surface area of each surface of the web, leaving between about 40% and about 85% of the surface of the web free from bonding material in the finished web product. The patterns disclosed in U.S. Pat. Nos. 3,047,444; 3,009,822; 3,059,313; and 3,009,823 may be advantageously employed. Some migration of bonding material occurs after printing, and the pattern of the rotogravure roll is chosen accordingly. Thus, the bonding material penetrates into the thickness of the web 19 and in all directions of the plane of the web 19. To practice the most preferred form of the invention, migration in all directions in the plane of the web should be controlled to leave areas of between about 50% and about 75% of the finished web surface free from any bonding materials.

It has been found to be particularly desirable when the web consists principally of papermaking fibers for the patterns of bonding material in the surface regions to be reticular patterns so the bonding material forms a net-like web of strength through the surface of the web. It is well known that papermaking fibers generally have a length less than about one-fourth inch and normally have a predominate fiber length less than about one-sixteenth of an inch in length. Therefore, where strength is to be primarily imparted to a sheet by bonding material, as in the preferred form of the present invention, instead of through interfiber bonds of the type conventionally utilized in papermaking, it is important that there be a continuous interconnection of at least some of the fibers by the bonding material throughout the entire web. If the pattern of bonding material is in the form of parallel lines, bars, or other forms of discrete areas, the web will lack substantial strength unless such discrete areas are spaced apart by distances less than the average fiber lengths. However, when the pattern of adhesive is reticular or net-like in configuration, the interconnected lines of bonding material provide a network of strength even where substantial areas are defined between the lines of bonding material application as unbonded web portions.

The pattern of penetrating bonding material which penetrates through the web to interconnect the surface regions may be in any form of fine lines or fine discrete areas, which occupy less area in the plane of the web than the surface bonding material in at least one surface region. Because the penetrating bonding material is applied primarily for the purpose of tying the two surfaces of the web together, it is not necessary that it cover a very large percent of the surface area of the web, and it is disadvantageous for reasons discussed above. Preferably, this pattern occupies less than about 10% of the plane area of the web, and even more preferably, from about 0.05% to about 2%. Where surface dispositions of bonding material are applied to both sides of the web, it is preferable that the penetrating bonding material occupy less than about 5% of the plane area of the web. It is acceptable, and even preferable, that the spacing between the bonded areas in this pattern be relatively large, preferably from about one-eighth of an inch to about 3 inches apart, and even more preferably between about one-half inch and about 1½ inches apart. It has been found that a small dot, about one thirty-second of an inch in diameter is an excellent shape and size for this pattern. When practicing the form of the invention which applies a surface disposition of bonding material on one side of the web only, and when the web is made from very short fibers, it is preferable to space the penetrating dots of bonding material closer, less than one-eighth inch apart and even as close as one thirty-second inch apart. Of course, it is to be recognized that the dot does not necessarily have to be circular, but could be any other shape which is functionally equivalent, such as a square or rectangle, etc. It is highly desirable that the penetrating bonding material in this pattern be uniformly spaced to maximize the distance between adjacent groups of bonding material. It should be noted here that the location of the penetrating bonding material in this pattern does not necessarily have to be apart from the location of the surface bonding material in the surface regions, but could be superimposed in spaced locations upon the pattern of surface bonding material in a surface region. It should also be noted here that the percentage area in the plane of the web referred to herein is measured at the location in the web where the penetrating bonding material occupies the largest area. In most cases, this location is the surface in which the penetrating bonding material was applied.

Migration and penetration of the bonding materials is influenced, and thus can be controlled, by varying the basis weight of the web itself and by varying the pressure applied to the web during application of the bonding material thereto, since wicking through the web is enhanced when the fibers are compacted closely together. Also, changing the nature of the bonding material and its viscosity will affect migration and penetration of the bonding material. In addition, varying the amount of time between application of the bonding material and setting or curing of the material will affect penetration, as well as varying base web moisture content and pressure roll loading at the dryer. A determination of the exact required conditions is easily within the skill of a papermaker without undue experimentation once he decides which bonding material he wishes to use and how much penetration he wishes. It should be noted here that at occasional locations, some of the bonding material will penetrate further or less than desired due to inherent process deviations. The critical and preferred ranges of bonding material penetration and migration expressed herein, therefore, refers only to the great majority of the web and does not preclude the possibility of occasional variances.

Where the penetrating bonding material is applied from the same rotogravure roll as the surface bonding material which bonds one surface region, all of these factors described above for controlling migration and penetration of the bonding material will be the same for both patterns. Therefore, the greater penetration desired for one pattern must be obtained through design of the pattern of the rotogravure roll itself. This is accomplished by using deeper engraved cells for one pattern than for the other pattern. Thus, the amount of penetration of the bonding material into the web is controllable by the depth of the bonding material in the rotogravure roll cell. Of course, where penetrating bonding material is applied from a separate rotogravure roll, depth of penetration can be controlled by other factors, such as viscosity of the bonding material.

The bonding material utilized in the process and product of the preferred forms of the present invention must be capable of several functions, one being the ability to bond fibers in the web to one another and the other being the ability to adhere the bonded portions of the web to the surface of the creping drum so that the web may be controlled pattern creped. In general, any material having these two capabilities may be utilized as a bonding material, if the material can be dried or cured to set it. Among the bonding materials which are capable of accomplishing both of these functions and which can be successfully used are acrylate latex rubber emulsions, useful on unheated as well as heated creping surfaces; emulsions of resins such as acrylates, vinyl acetates, vinyl chlorides, and methacrylates, all of which are useful on a heated creping surface; and water soluble resins such as carboxy methyl cellulose, polyvinyl alcohol, and polyacrylamide. However, in other instances, the bonding material may comprise a mixture of several materials, one having the ability to accomplish interfiber bonding and the other being utilized to create adherance of the web to the creping surface. In either instance, the materials are preferably applied as an integral mixture to the same areas of the web. Such materials may also comprise any of the materials listed above, mixed with a low molecular weight starch, such as dextrin, or low molecular weight resin such as carboxy methyl cellulose or polyvinyl alchohol. It should be noted here that when practicing the forms of the invention which do not require two controlled pattern crepes, one of the bonding materials can be chosen for its ability to bond fibers together only. Also, the bonding material penetrating through the central core region of the web can be chosen for its ability to bond fibers together only.

In producing the preferred product of the present invention, elastomeric bonding materials are employed which are basically materials which are capable of at least 75% elongation without rupture. Such materials generally should have a Young's modulus by stretching which is less than 25,000 psi. Typical materials may be of the butadiene acrylonitrile type, or other natural or synthetic rubber latices or dispersions thereof with elastomeric properties, such as butadiene-styrene, neoprene, polyvinyl chloride, vinyl copolymers, nylon, vinyl ethylene terpolymer. The elastomeric properties may be improved by the addition of suitable plasticizers with the resin.

The amount of bonding material applied to the web can be varied over a wide range and still obtain many of the benefits of the invention. However, because the preferred uses for the products of the invention are for absorbent wiper products, it is desirable to keep the amount of bonding material to a minimum. In the preferred forms of the invention, it has been found that from about 3% to about 20% of total bonding material (based upon dry fiber weight of the finished web product) is satisfactory, and from about 7% to 12% is preferred.

THe creping drum 27 may in some instances comprise a heated pressure vessel such as a Yankee dryer, or in other instances may be a smaller roll and may be unheated. It is characterized by an extremely smooth, polished surface to which the bonding material applied to the web adheres. The necessity for heating depends upon both the characteristics of the particular bonding material employed and the moisture level in the web. Thus, the bonding material may require drying or curing by heating in which case the creping drum may provide a convenient means to accomplish this. Or, the moisture level of the web being fed to the creping drum may be higher than desired, and the creping drum may be heated to evaporate some of this moisture. It should be noted here that some bonding material may not require the curing or dying step effected by the curing or dying station 42 in FIGS. 2, 3, and 4 or drying station 29 in FIG. 2.

The amount of creping applied to the web during each controlled pattern creping step may be varied and still obtain benefit from the invention. However, it has been found that from about 3% to about 20% per creping operation produces a desirable product, and from about 7% to about 12% per creping operation is preferred.

Figures 5, 6:
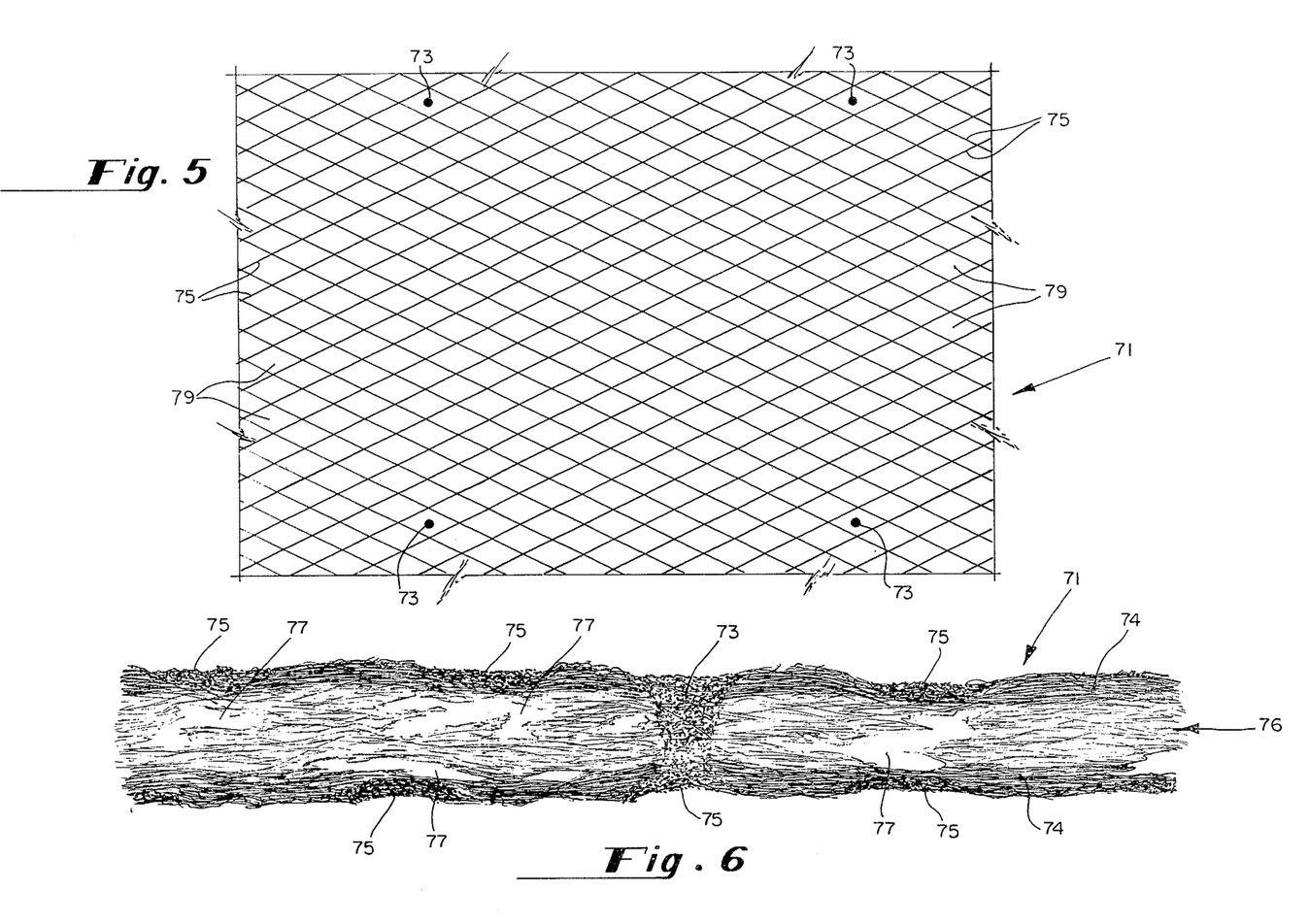
FIG. 5 is a greatly enlarged planar view of a portion of one side of the sheet material of the invention.
FIG. 6 is a greatly enlarged view of a portion of the sheet material of the invention in a cut-away view through the web of the invention.

FIG. 5 illustrates one form of sheet material of the present invention in which surface bonding material 75 in the surface region of the web 71 is in a recticular netlike pattern forming discrete, discontinuous surface areas 79 where the bonding material 75 is not disposed. Only one surface of the sheet 71 is shown, but surface bonding material may have been applied to the opposite surface of the sheet in a pattern which may or may not be the same pattern as that illustrated. At uniformly spaced-apart locations on the web 71, a penetrating disposition of bonding material 73 has been applied in another pattern. The penetrating bonding material in this pattern is shown as discrete areas of dots. The penetrating bonding material 73 extends through the web to connect the two surface regions together.

In one embodiment of the invention, there is no surface disposition of bonding material in the opposite surface region like the surface bonding material 75 illustrated in FIG. 5, and the penetrating bonding material 73 extends to the surface of the opposite side of the web where it functions to bond fibers together on that surface and to increase abrasion-resistance.

FIG. 6 illustrates a cross-sectional view of a sheet similar to that illustrated in FIG. 5. FIG. 6 was drawn from a photomicrograph of an actual sheet of the present invention which was made from a slurry mixture of 100% unrefined dry lap wood pulp fibers formed into a base sheet having a basis weight of 37 lbs./2,880 ft.$^2$. The base sheet was formed on an apparatus similar to that illustrated in FIG. 1 and was processed by the method of the invention on an apparatus similar to that illustrated in FIG. 3. The finished product had a basis weight of 54 lbs./2,880 ft.$^2$ and a bulk of 0.720 inch per 24 sheets. The sample was stained to distinguish the fibers from the bonding material and cut in the machine direction. The sample was magnified 50 times in the photograph and the drawing is approximately to the same scale.

Still referring to FIG. 6, the sheet material 71 displays two surface regions 74 and a central core region 76, all in an integral web. The web is generally undulating due to creping and has surface bonding material 75 disposed at spaced locations in a fine, spaced-apart pattern on one surface and in another fine, spaced-apart pattern on the other surface of the web 71.

Penetrating bonding material 73 extends from one surface of the web entirely through the central core region 76 and interconnects with surface bonding material 75 in the surface region 74 on the opposite side of the web. It should be noted that it is not necessary for penetrating bonding material 73 to connect with the surface bonding material 75 on the opposite surface to tie the two surfaces together, as long as both bonding materials join to mutual fibers. To assure this, penetrating bonding material 73 should penetrate to within a fiber thickness of the surface bonding material 75 on the opposite surface, it being recognized that in planar-aligned fibrous webs, the fibers orient themselves generally in the plane of the web. In applying the penetrating bonding material 73, it is not necessary to register its pattern with the pattern of surface bonding material 75 on the opposite surface in order to assure that the two bonding materials will interconnect. By choosing a pattern for the surface bonding material 75 on the opposite surface which occupies at least about 15% of the surface area, and is quite closely spaced compared to the pattern of the penetrating bonding material 73, a large percentage of the penetrating bonding material 73 interconnecting with the surface bonding material 75 on the opposite surface or to mutual fibers will be assured.

The surface bonding material 75 bonds at least some of the fibers together to form bonded web portions located throughout the surface regions 74. The unbonded web portions are only held together by bonds which are formed on the web prior to application of the bonding material and, as pointed out above, preferably have very low interfiber bonding strength.

It is preferred that the surface bonding material 75 on either side of the web migrates through only a minor portion of the thickness of the web. It is important to the invention that the surface bonding materials do not generally extend all the way through the web, whether is it surface bonding material from one surface of the web extending through to the other surface or surface bonding material from one surface extending into contact with surface bonding material from the other surface. It is the portions of the web which do not have the bonding material applied in the steps of the invention that are most greatly affected by the creping step to form the soft, absorbent central core region. The best way to assure that excessive penetration of the surface bonding materials does not occur is to limit penetration of the surface bonding material on either side of the web to no more than about 40% through the thickness of the finished web product. More preferably this surface bonding material extends less than about 30% through the thickness of the web. In some embodiments, the penetration of the surface bonding material on one side of the web may be more than 40%, even up to 60%, as long as the penetration of the surface bonding material on the other side of the web, if any exists, is not so great as to interconnect the surface bonding materials on both sides of the web. Also, deeper penetration of the surface bonding material, up to 60% on both sides, can be practiced if the pattern on the two sides are so chosen or so placed with respect to each other that connection of surface bonding materials from the two sides does not generally occur.

However, it is also highly preferable in order to obtain the greatest advantage of the invention, that the surface bonding materials penetrate a significant distance into the web from the surface, at least 10% of the web's thickness and more preferably at least 15%. This degree of penetration will assure formation of the desirable properties in the surface regions as described above.

Still referring to FIG. 6, the surface regions 74 in the web 71 have a greater concentration of fibers than the central core region 76, creating three laminate-like regions. The greater concentration of fibers in the surface regions 74 is caused in part by the contraction of the surface bonded regions upon controlled pattern creping the web and by the resistance to disruption of the surface regions of the web upon creping, due to strength imparted by the surface bonding material 75. The surface regions are generally coextensive with the penetration of the surface bonding material 75. The central core region 76 has split regions or cavities 77 throughout generally close to surface bonding material 75. These cavities 77 result from the creping effect upon the central core region 76, having fibers which are not held tightly together, along with the general reduction of fiber concentration. It is this action which greatly enhances the bulk and softness of the web in addition to substantially increasing its absorbentive capacity.

FIG. 6 illustrates a web produced by the apparatus of FIG. 3. That is, the web has been subjected to controlled pattern creping on both sides. However, the web produced by the method and apparatus of FIG. 2 or FIG. 4 would be somewhat similar to that illustrated in FIG. 6, one difference being that the double controlled pattern creped product has a greater number and greater size split areas or cavities 77 in the central core region 76 of the web than one having the same degree of creping and from the same base web when subjected to the single controlled pattern creping. One of the surfaces in the web illustrated in FIG. 6 is flatter than the other surface. The flatter surface was the surface adhered to the creping surface during the last controlled pattern crepe of the web. Such surface configurations are somewhat typical, although other variations might occur.

The bonded regions shrink or contract when subjected to controlled pattern crepe and compact the fibers together in the surface region in that surface, thus permitting elongation of the web in both the cross-direction and the machine direction due to the ability of the compacted fibers to separate when the sheet is subjected to tension. Therefore, the resulting sheet material possesses substantial stretch in all directions in its plane. In this manner, the method of the invention provides a simple and convenient process for creating multidirectional stretch in a web without the complexity and difficulty in the prior art methods discussed above, such as creping the web twice in different directions. To illustrate, sheet materials of the present invention typically have stretch in the machine direction up to about 40% and stretch in the cross-machine direction up to about 25%.

Furthermore, when the portions of the web surface not having bonding material are compacted or compressed to force the fibers closer together, the closer fibers decrease the sizes of the openings between the fibers and, therefore, increase the capillary action of moisture drawn into the web. This results in better wipe-dry properties of the web. This is especially beneficial in dry formed fibrous webs and aqueous formed webs of reduced interfiber bonding, where the fibers generally are not as tightly compacted upon being formed into a web as might be desired for wipe-dry properties.

Referring back to FIG. 5, the reticular bonding pattern illustrated has an additional feature over a pattern of discrete bonded regions, which could also be employed. Since the pattern of the bonded areas is net-like rather than discrete, the compression effect in the unbonded web portions is even further enhanced, resulting in even greater machine direction and cross-machine direction stretch in the resulting product. In addition, a higher percentage of the web may be unbonded relative to a product having the principal bonding material in discrete areas. Thus, since the bonding pattern in this embodiment is substantially continuous and interconnected, the unbonded web portions 79 between the lines of bonding 75 can be larger and still provide the web strength required. This is due to continuous lines of adhesively interconnected fibers which are distributed over the surface to provide a net-like web of strength.

Having described the invention, I claim:

1. Fibrous sheet material comprising a soft, absorbent, single-ply, laminate-like web of fibers which are randomly oriented in the plane of the web and which have a predominate length of less than one-fourth inch, the basis weight of the web being from about 20 to about 100 lbs. per 2,880 square feet, the web having two surface regions interconnected by a soft, absorbent central core region having less fiber concentration than the surface regions, bonding material disposed in a fine, spaced-apart, first pattern in the first surface region of the web to bind the fibers in that surface region into a strong network, the first pattern occupying from about 15% to about 60% of the surface area of the web on its respective surface, bonding material disposed in a fine, spaced-apart, second pattern in the second surface region of the web to bind the fibers in that surface region into a strong network, the second pattern occupying from about 15% to about 60% of the surface area of the web on its respective surface, the penetration of the bonding material in each of the first and second patterns being from about 10% to about 60% of the web thickness, and the bonding material in the second pattern being generally unconnected to the bonding material in the first pattern, bonding material disposed in a fine, uniformly spaced-apart, third pattern in the first surface region of the web and generally penetrating through the thickness of the web to at least within a fiber thickness of the bonding material in the second pattern, whereby the two surface regions of the web are interconnected with bonding material, the third pattern occupying less area in the plane of the web than the first pattern and than the second pattern, and in at least one surface region of the web the bonded web portions being finely creped.

2. Fibrous sheet material according to claim 1, wherein
the web is characterized by having very low interfiber bonding strength in the areas where bonding materials are not diposed, and
the third pattern occupies less than about 5% of the surface area of the first surface region of the web.

3. Fibrous sheet material according to claim 1, wherein
the fibers in the web are predominately lignocellulosic fibers,
the bonding materials are elostomeric materials, and
the third pattern occupies from about 0.05% to about 2% of the surface area of the first surface of the web.

4. Fibrous sheet material according to claim 3, wherein
the penetration of the bonding material in each of the first and second patterns is from about 10% to about 40% of the web thickness, and
the third pattern is arranged to uniformly space groups of bonding material in that pattern apart from each other from about ⅛ inch to about 2 inches across the first surface of the web.

5. Fibrous sheet material according to claim 4, wherein the third pattern is superimposed upon the first pattern.

6. Fibrous sheet material according to claim 4, wherein
the bonding material in the third pattern generally penetrates into the thickness of the web far enough to interconnect with the bonding material in the second pattern, and
the first and second patterns are continuous reticular, and the third pattern is discontinuous and discrete.

7. Fibrous sheet material according to claim 6, wherein the third pattern comprises spaced-apart dots.

8. Fibrous sheet material according to claim 7, wherein the spacing between each dot is from about ½ to about 1½ inches.

9. Fibrous sheet material according to claim 8, wherein the web is formed by deposition of dry fibers upon a forming surface.

10. Fibrous sheet material as recited in claim 8, wherein the web is formed from an aqueous slurry of fibers deposited upon a forming surface.

11. Fibrous sheet material as recited in claim 10, wherein the web has been formed under conditions of reduced pressing until the web was substantially dry to reduce its inter-fiber bonding strength by reducing the amount of inter-fiber contact.

12. Fibrous sheet material according to claim 8, wherein the web is formed from 100% lignocellulosic fibers.

13. Fibrous sheet material according to claim 8, wherein the bonded regions of the web on both surfaces have been finely creped.

14. Fibrous sheet material according to claim 13, wherein
the web has a basis weight of from about 25 to about 60 pounds per ream of 2880 square feet,
the first and second patterns each occupy from about 25% to about 50% of the surface area of their respective surface regions, and
the bonding material in the first and second patterns each penetrate into the web from about 15% to about 30% of the web thickness.

* * * * *

UNITED STATES PATENT AND TRADEMARK OFFICE
CERTIFICATE OF CORRECTION

PATENT NO. : 3,903,342

DATED : September 2, 1975

INVENTOR(S) : Clifford J. Roberts, Jr.

It is certified that error appears in the above-identified patent and that said Letters Patent are hereby corrected as shown below:

Column 1, line 7, insert a hyphen "-" between "single" and "ply".
Column 7, line 2, change "bonded" to --bounded--.
Column 13, line 21, change "pullrolls" to --pull-rolls--.
Column 15, line 9, change "preferably" to --perferable--.
Column 17, line 3, change "THe" to --The--.

Signed and Sealed this

Fifteenth Day of July 1980

[SEAL]

Attest:

SIDNEY A. DIAMOND

Attesting Officer

Commissioner of Patents and Trademarks